(12) United States Patent
Pareek et al.

(10) Patent No.: US 7,885,922 B2
(45) Date of Patent: Feb. 8, 2011

(54) APPARATUS AND METHOD FOR CREATING A REAL TIME DATABASE REPLICA

(75) Inventors: Alok Pareek, Brisbane, CA (US); Eric Ian Fish, Kentfield, CA (US)

(73) Assignee: Oracle International Corporation, Redwood Shores, CA (US)

( * ) Notice: Subject to any disclaimer, the term of this patent is extended or adjusted under 35 U.S.C. 154(b) by 114 days.

(21) Appl. No.: 11/551,678

(22) Filed: Oct. 20, 2006

(65) Prior Publication Data

US 2007/0100912 A1 May 3, 2007

Related U.S. Application Data

(60) Provisional application No. 60/731,432, filed on Oct. 28, 2005.

(51) Int. Cl.
*G06F 17/30* (2006.01)
(52) U.S. Cl. .................. 707/610; 707/640; 707/661
(58) Field of Classification Search .................. None
See application file for complete search history.

(56) References Cited

U.S. PATENT DOCUMENTS 5,640,561 A * 6/1997 Satoh et al. ............ 707/202
6,289,357 B1 9/2001 Parker
6,584,477 B1 6/2003 Mosher
2003/0093443 A1* 5/2003 Huxoll ................ 707/204
2003/0208511 A1 11/2003 Earl et al.
2004/0267828 A1 12/2004 Zwilling
2005/0049945 A1 3/2005 Bourbonnais et al.
2006/0242371 A1* 10/2006 Shono et al. ........... 711/162

FOREIGN PATENT DOCUMENTS

EP       1 498 815 A       1/2005
WO    WO 2004-013725 A    2/2004
WO    WO 2005-086032 A    9/2005

OTHER PUBLICATIONS

Melnyk, Roman. "Using DB2 utilities to clone databases across different platforms." IBM Technical library. IBM, Mar. 18, 2004. Web. May 25, 2010. <http://www.ibm.com/developerworks/data/library/techarticle/dm-0403melnyk/index.html>.*
EP 06 82 6229.4, Filed Oct. 20, 2006, Supplemental European Search Report dated Dec. 8, 2009, 5 pgs.

* cited by examiner

*Primary Examiner*—Mohammad Ali
*Assistant Examiner*—Syed H Hasan
(74) *Attorney, Agent, or Firm*—Townsend and Townsend and Crew LLP (57) ABSTRACT

A method of processing data includes identifying a capture redo byte address, initiating a capture process at the capture redo byte address, creating a clone of a source database to a logical change number, and initiating an apply process at a target database.

8 Claims, 6 Drawing Sheets

APPARATUS AND METHOD FOR CREATING A REAL TIME DATABASE REPLICA

CROSS REFERENCE TO RELATED APPLICATIONS

This application claims the benefit of U.S. Provisional Application No. 60/731,432, entitled "A Non Quiesced Approach to Creating a Real-Time Database Replica Across Heterogeneous Systems," filed on Oct. 28, 2005, the contents of which are hereby incorporated by reference in their entirety.

BRIEF DESCRIPTION OF THE INVENTION

The present invention relates generally to the processing of database systems. More particularly, the present invention relates to a technique for replicating a database system.

BACKGROUND OF THE INVENTION

The widespread use of the world-wide web along with high bandwidth transmissions, the proliferation of web browsers on personal computers, and increased use of internet-ready handheld devices has led to stringent availability requirements on database systems. Availability refers to data being accessible for reading and writing purposes using a procedural language that can manipulate data, such as structured query language (SQL). With increased availability requirements, most critical databases must allow for information to be searched, retrieved, and updated outside of conventional business hours. As a result, businesses and other enterprises managing databases have been challenged to address around the clock data availability requirements.

One approach to build high availability systems is to construct a replica of a source database system to a target database system. Such a procedure may be desired to provide access to a database system in the event of a planned or unplanned outage. Additionally, retaining several copies of a system database permits multiple system applications to manage data independently. Replication of a system database is commonly achieved by making an initial copy of the data an instantiation, and subsequently applying the database's transaction (redo/undo) logs to propagate the on going changes from the source to the target database.

However, current techniques designed to construct the initial copy of the source database commonly require the source database or application to be shutdown during data extraction, or to implement some form of "locking" or "quiescing" on the database. Quiescing is the act of making data, or a portion of the data, unavailable for read or write access. Alternatively, other techniques restrict the data to read-only access while the replica is being constructed. Nevertheless, all of these techniques have a measurable impact on the availability of data in a system database because they restrict access to the data, or a portion thereof. Therefore, it would be desirable to provide for a method to construct a replica of a database without affecting system performance or the availability of data.

SUMMARY OF THE INVENTION

The invention includes a computer-readable medium to direct a computer to create a replica of a source database. The computer-readable medium has executable instructions to identify a capture redo byte address, initiate a capture process at the capture redo byte address, create a clone of the source database to a logical change number, and initiate an apply process at a target database.

The invention also includes a method of processing data. The method includes identifying a capture redo byte address, initiating a capture process at the capture redo byte address, creating a clone of a source database to a logical change number, and initiating an apply process at a target database.

The invention addresses the issue of keeping two separate databases synchronized at an operational level. Applications where the invention may be used include migrating a database, updating a database, creating a data warehousing environment, and setting up a logical standby basis. A replica database is created from a source database via transactional logs. The method ensures that there are no collisions or inconsistencies in data at the replica database and that the data stored in the replica is identical to that in the source database. Creation of the replica database has no affect on the performance or availability of data in the source database. The source database is fully available for all normal operations and undergoes no downtime or quiescing. The replica may be created on a homogeneous or heterogeneous system.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION OF THE INVENTION

Figure 1:
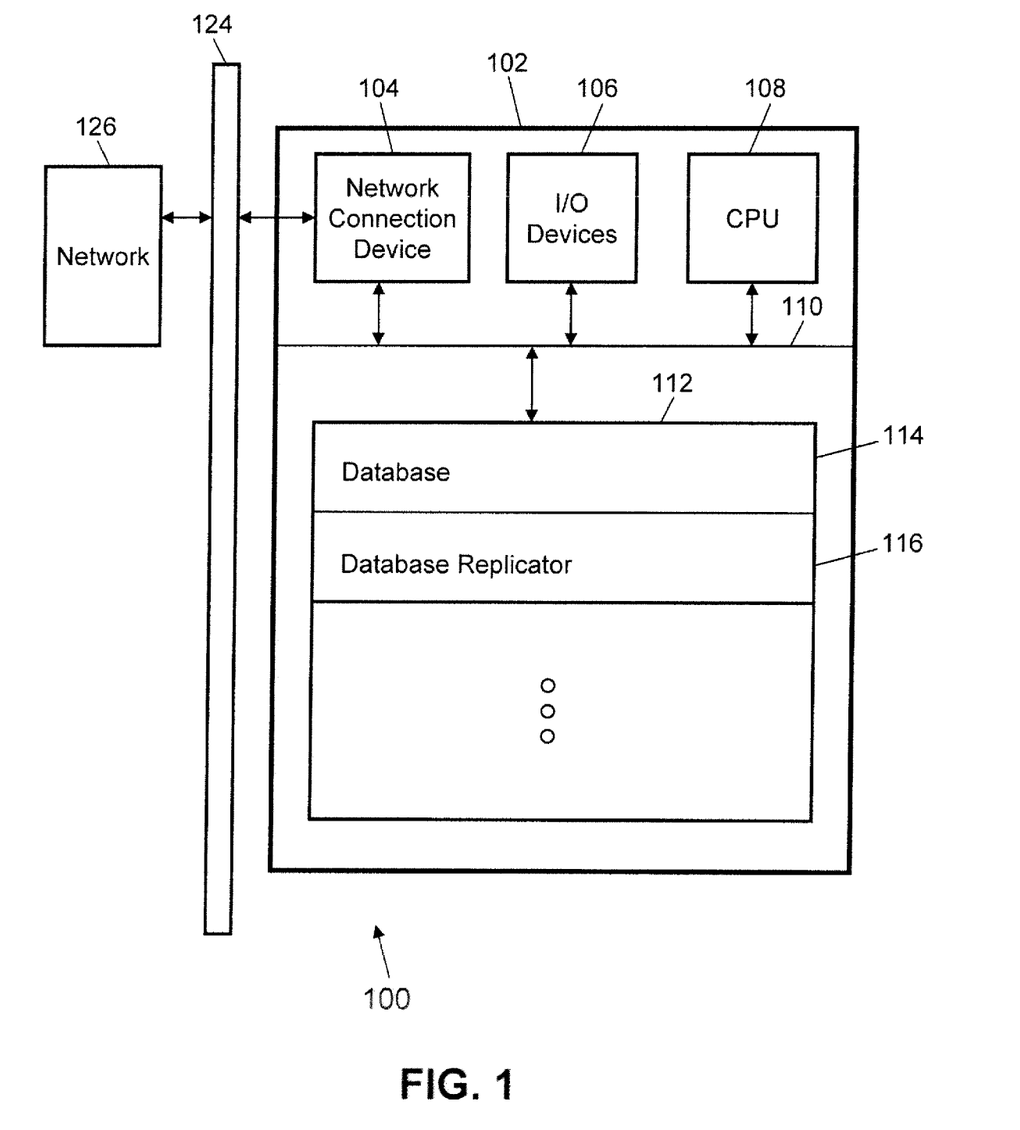
FIG. 1 illustrates a computer that may be operated in accordance with an embodiment of the invention.

FIG. 1 illustrates a computer network 100 that may be operated in accordance with an embodiment of the invention. The computer network 100 includes a computer 102, which, in general, may be a client computer or a server computer. In the present embodiment of the invention, the computer 102 is a server computer including conventional server computer components. As shown in FIG. 1, the computer 102 includes a Central Processing Unit ("CPU") 108 that is connected to a network connection device 104 and a set of input/output devices 106 (e.g., a keyboard, a mouse, a display, a printer, a speaker, and so forth) via a bus 110. The network connection device 104 is connected to network 126 through the network transport medium 124, which may be any wired or wireless transport medium.

The CPU 108 is also connected to a memory 112 via the bus 110. The memory 112 stores a set of executable programs. One executable program is the database replicator 116. The database replicator 116 includes executable instructions to access a data source to construct a replica of a database located in the data source. By way of example, the data source may be database 114 resident in memory 112. The data source may be located anywhere in the network 126.

While the various components of memory 112 are shown residing in the single computer 102, it should be recognized that such a configuration is not required in all applications. For instance, the database replicator 116 may reside in a separate computer (not shown in FIG. 1) that is connected to the network 126. Similarly, separate modules of executable code are not required. The invention is directed toward the operations disclosed herein. There are any number of ways and locations to implement those operations, all of which should be considered within the scope of the invention.

Figure 2:
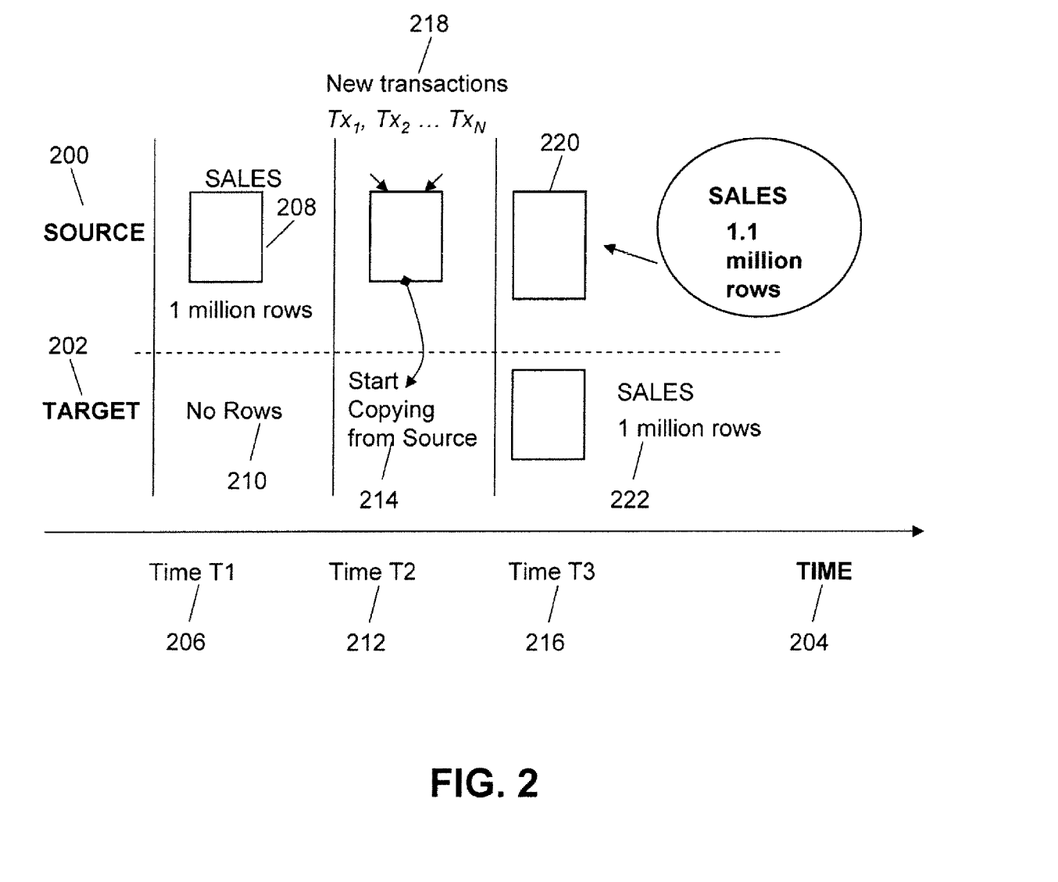
FIG. 2 illustrates the difficulty in creating a real time copy of a database.

The primary problem in building a real time copy of a database is that during the time required to create an initial copy, the original database evolves as it is continuously processing newer transactions. For instance, FIG. 2 illustrates the difficulty in trying to make a replica of a source database 200 to a target database 202 over time 204. At Time T1 206 the source database 200 has 1 million rows 208 and the target database 202 has no rows 210. At Time T2 212 the contents of the source database 200 are copied 214 to the target database 202 using techniques described later. However, by the time the copying is complete, Time T3 216, the source database 200 has processed new transactions 218 that have increased the number of rows 220 in the source database 200 to 1.1 million. Nonetheless, the target database 202 only contains the 1 million rows 222 that were copied from the source database 200 at Time T2 212. This will result in conflicting data content between the original database and the replicated database, which will appear inconsistent from an application or end user's perspective. To prevent this occurrence, previous techniques have started capturing any database changes from the database's transactional logs, described below, before the actual copy is made. Nonetheless, such techniques have a major impact on data availability, as they require the source database to be quiesced or shutdown until all active transactions are completed.

Figure 3A:
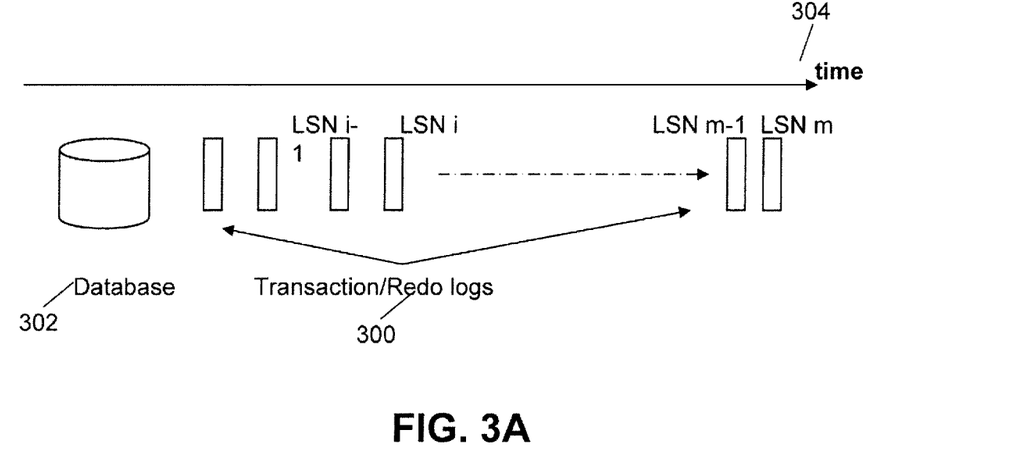
FIG. 3a illustrates redo logs that may be contained in a database.

Most relational database implementations use logging techniques that store before and after images of changed data to generate a transactional log, or redo log, that is stored in non volatile (e.g. disk) storage. The database transaction log, using techniques well known in the art, captures modifications made to the data pages of a database as redo log records that represent atomic state transitions within a database. Before the information is transferred to a transaction log, it is changed using standard SQL operations such as inserts, updates and deletes. Once a transaction log gets filled, it gets archived for recovery purposes and the database starts writing a new redo log file. Each redo log has a unique Log Sequence Number (LSN) associated with it. For example, FIG. 3a illustrates multiple redo logs 300 and their respective LSNs for a given database 302. As time 304 passes and the database 302 processes more transactions, the database 302 produces additional transactional logs.

Figure 3B:
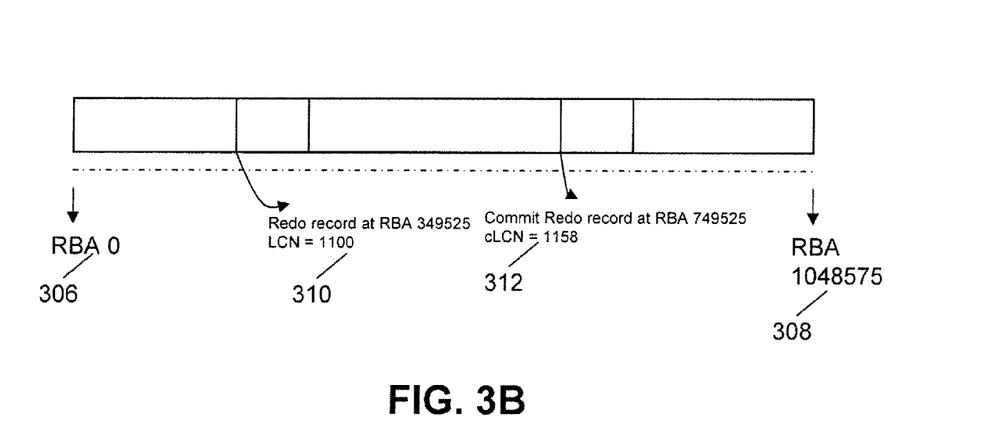
FIG. 3b illustrates an exemplary redo record with redo byte addressing.

One transaction can generate multiple redo records and each redo record produces a unique logical change number (LCN) and redo byte address (RBA) that help to maintain ordering between changes made by multiple transactions. The RBA indicates the physical location in the redo log file where the redo record was written. Additionally, the transactional log contains a commit logical change number (cLCN) for the redo record that committed the transaction. To illustrate, FIG. 3b presents an example of the content of an LSN. The LSN starts at RBA 0 306 and ends at RBA 1048575 308. FIG. 3b also displays a transaction that generated a redo record at a LCN of 1100 310 that eventually commits with another redo record with a cLCN of 1158 312.

Of the various software methods that replicate data across different database systems (homogeneous or heterogeneous), the one applicable to the invention is termed Log Based Replication (LBR). Typically, in a database that has been operating over a long period of time it is not feasible to start replication with the first LSN that was recorded. Accordingly, the replication method employed by the invention uses a start LCN to begin the replication process. The replication of transactions committed prior to the start LCN is referred to as instantiation. The replication is accomplished through a two step process. First, a capture process, Log Based Extraction (LBE) Capture, reads the source database's transactional logs and captures the transactional changes present. The capture process maintains a queue of all transactions in the database. Once a transaction commits, the changes are transmitted to the replica database. Second, an apply process, LBE Apply, applies the changes at the target database that were captured by the LBE Capture process. Thus, LBR is a data replication method accomplished by translating the redo changes from a log file back into transactions that subsequently get executed into the target database.

While there are a number of techniques existing in the art to perform instantiation the one relevant to the invention is the use of online backups. One method of taking an online backup is by taking a hot backup. Databases provide commands that allow functionality to take an online backup by indicating that a backup will be performed on the data. The indication marks the beginning of a hot backup LCN within the database being backed up. While the backup is being made, the database continues to issue writes on the data within the files being backed up. Recovery is required because the backup database may contain data from transactions that have not yet committed or not contain data from transactions that have committed. Accordingly, a recovery on the database backup is then executed in order to satisfy database consistency requirements. As the source database is continuously accepting on going transactions, the recovery will be done to a recovery LCN that is to a point in time behind the source database. Other methods that may be employed to perform instantiation include using data unload/load methods and generating split mirror backups. Additionally, handling functionality may be employed to prevent the same set of data from being inserted twice into the target database.

The recovered database using backup techniques is known as the clone database. The clone database is a copy of the source database containing all committed transactions as of the recovery LCN, but not containing any transactions made on the source database subsequent to or at the recovery LCN. Thus, the clone database is a copy of a database as of a prior point in time. The clone database is homogenous to the source database. Accordingly, if a clone database is desired across a heterogeneous system, a new database must be created. Data from the clone database is transferred to a new heterogonous target database, the cross-clone database. The cross-clone database contains all of the transactions that are present in the clone database, but is not homogeneous with respect to the clone database. For example, Table 1 displays exemplary specifications of a source, clone, and cross-clone database. The clone database is recovered up to a recovery LCN that is lower than the current committed LCN of the source database. In addition, the cross-clone database contains the same transactions as the clone database, but operates on a different system platform.

TABLE 1

Exemplary source, clone, and cross-clone database information

| Database | System | Transactions |
|---|---|---|
| Source | Oracle 10g on Linux IA (32-bit) | Committed until current LCN 12000 |
| Clone | Oracle 10g on Linux IA (32-bit) | Committed until recovery LCN 10000 |
| Cross-Clone | Sybase 12.x on Microsoft Windows XP | Committed until recovery LCN 10000 |

Generally, log based extraction using online backup techniques involve the following steps: quiescing the database capturing changes at the source database using LBE Capture, placing the source database in online backup mode using database commands, backing up the source database using a hot backup or split mirror technique, creating a clone database, generating a cross-clone database if the target database is on a heterogeneous system, and applying the changes captured by the LBE Capture process in conjunction with handle collision functionality to avoid any duplication in data captured by both the clone and LBE Capture process. However, these techniques still require the database to be quiesced and may have a considerable affect on the performance of the source database.

Figure 4:
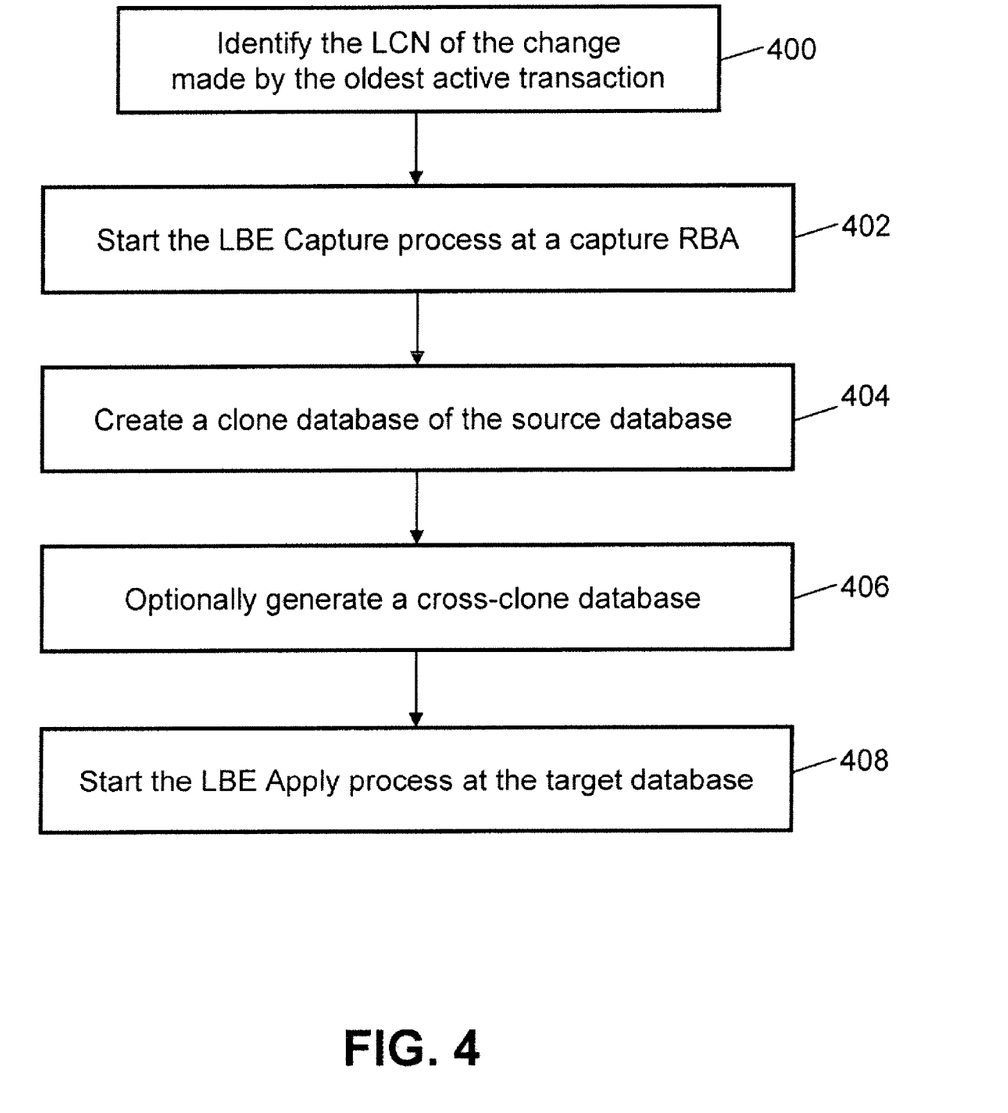
FIG. 4 illustrates processing operations performed in accordance with an embodiment of the invention.
Figure 5:
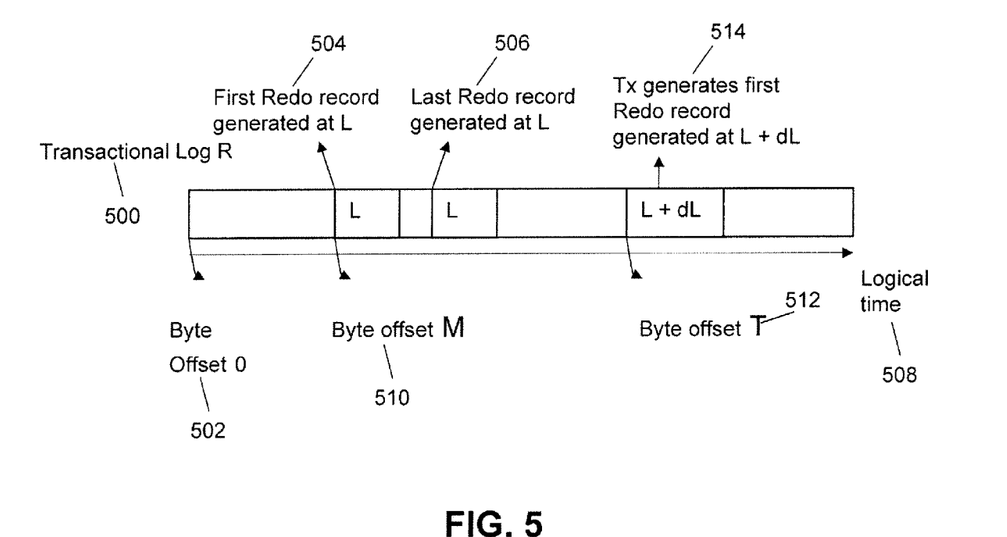
FIG. 5 illustrates an exemplary transactional log containing the oldest active transaction in a database.

The database replicator 116 of FIG. 1 replicates a database according the processing operations illustrated in FIG. 4. As shown in FIG. 4, the first processing operation is to identify the LCN that represents a low watermark for the change made by the oldest active transaction 400. The LCN, L, is guaranteed to be at a lower logical time than the first change made by the oldest transaction and may be identified using a query on the source database that lists all active transactions. FIG. 5 illustrates an exemplary transactional log R 500, beginning at byte offset 0 502, that contains the first redo record generated at L 504 and the last redo record generated at L 506 over a logical time axis 508. As shown in FIG. 4, the next processing operation executed by the database replicator 116 is to start the LBE capture process at a capture RBA 402. The source database provides the capture process with L and a physical log range that may contain redo records that were generated at L. The capture RBA may be a mark RBA, M 510, defined as the address of the first redo change made in the redo log that contains L. The mark RBA may be identified by scanning the source database starting with a physical redo range provided by the source database. Alternatively, if the redo logs in the source database are large, it may be more effective to define the capture RBA as the address, T 512, of the first redo record generated by the oldest active transaction in the database. Defining the capture RBA at T 512 ensures that the capture RBA is at a higher logical time than L. Specifically, the first redo record generated by the oldest active transaction, Tx, may be generated at a logical time L+dL 514.

Figure 6:
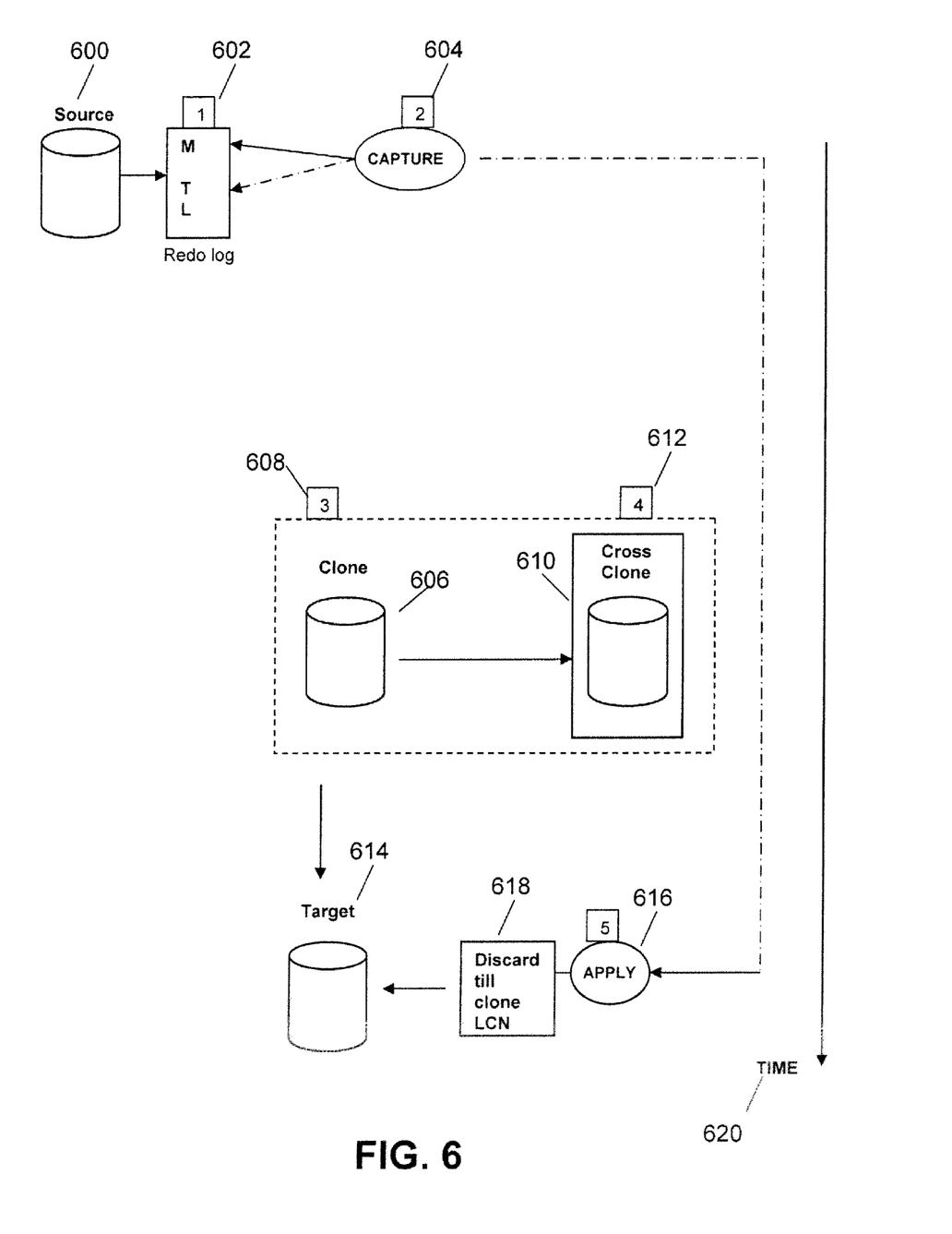
FIG. 6 illustrates a visual representation of the processing operations illustrated in FIG. 4.

Returning to FIG. 4, the next processing operation is to create a clone database of the source database 404. This can be achieved using the online backup techniques discussed above. The subsequent processing operation executed by the database replicator 116 is to optionally generate a cross-clone database 406. If the target database is located on a heterogeneous system, a cross-clone database will be generated. The last processing operation shown in FIG. 4 is to start the LBE Apply process at the target database 408. The LBE Apply process is supplied with a user defined clone LCN that represents the recovery LCN for the clone database. The LBE Apply process subsequently discards any transactions that were committed prior to the clone LCN and applies the changes captured by LBE Capture process. FIG. 6 provides a visual illustration of the processing operations exemplified in FIG. 4 over time 620. The LCN of the oldest change made by the oldest transaction in the source database 600 along with the capture RBA are identified 602 and an LBE Capture is executed on the source database 604. Subsequently, a clone database 606 is created 608 using an online backup technique and a cross-clone database 610 is optionally generated 612. Lastly, the clone database 606 or cross-clone database 610 is applied to the target database 614 and the changes captured by the LBE Capture process are applied 616 to the target database 614. The LBE apply process discards any changes 618 that were committed prior to the clone LCN.

Carrying out these processing operations enables a replica of the source database to be made without affecting source database performance or data availability. Any transaction in the source database must belong to one of three groups: transactions that committed before L, transactions that are active as of L but have not yet committed, and transactions that were submitted after L. If the transaction committed before L, it will also be committed in the target database because the clone or cross-clone database was recovered to a clone LCN higher than L.

If the transaction is in the second group, then it has either committed before the clone LCN or committed after the clone LCN. If the transaction committed before the clone LCN, it will already be included in the clone or cross-clone database. No duplication problem arises when applying the changes captured by the capture process because the LBE Apply process discards any transactions that are committed prior to the clone LCN. If the transaction committed after the clone LCN it will not be a part of the clone or cross-clone database, but it will be applied by the LBE Apply process. This result is certain, as the LBE Capture process was positioned such that it starts capturing changes at a logical time L, that is lower than the first change made by the transaction. Thus, the transaction will get captured by the LBE Capture process and applied by the LBE Apply process. Lastly, if the transaction is submitted after L, then both scenarios in group 2 are applicable. Similar to the second group, if the transaction committed before the clone LCN it will be in the clone or cross-clone database and if it committed after the clone LCN it will get applied by the LBE Apply process.

Ultimately, the invention enables the replication of a database without any of the performance or availability problems that exist in the prior art. The source database does not have to be quiesced or shutdown and it may actively accept both read and write operations. Additionally, no resource locks are required to replicate the database and active transactions are processed without any handling of collisions. Replication is completed in an extremely fast manner with no impact on source database system performance. Those skilled in the art will appreciate that the process disclosed may be applied when migrating databases, upgrading databases, creating a data warehouse environment, planning for disaster recovery, and setting up logical databases.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD- ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

While the present invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt to a particular situation, material, composition of matter, method, process step or steps, to the objective, spirit and scope of the present invention. All such modifications are intended to be within the scope of the claims appended hereto. In particular while the methods disclosed herein have been described with reference to particular steps performed in a particular order, it will be understood that these steps may be combined, sub-divided or re-ordered to form an equivalent method without departing from the teachings of the present invention. Accordingly, unless specifically indicated herein, the order and grouping of the steps is not a limitation of the present invention.

What is claimed is:

1. A computer-readable storage medium storing executable instructions to direct a computer to create a replica of a source database, comprising executable instructions to:
   receive a hot backup logical change number for the source database indicating initiation of hot backup replication of the source database;
   in response to receiving the hot backup logical change number, initiate hot back-up of the source database, wherein the initiating of the hot backup of the source database includes executable instructions to:
      form a clone of the source database up to the hot backup logical change number while the source database operates with full data availability, wherein the clone of the source database is a copy of the source database as of the hot backup logical change number, and wherein the source database operating with full data availability comprises actively accepting read and write operations on data within files being backed up during replication of the source database;
      transfer the clone of the source database to a replica database while the source database continues to operate with full data availability, wherein the clone of the source database includes transactions committed before the hot backup logical change number; and
      utilize a log based extraction apply process starting at the hot backup logical change number to update the replica database with transactions committed after the hot backup logical change number by generating a transaction log which includes transactions committed after the hot backup logical change number and before a commit logical change number, wherein the commit logical change number indicates read and write commands which were issued and not committed after the hot backup logical change number but before the commit logical change number.

2. The computer-readable storage medium of claim 1 wherein the log based extraction apply process discards transactions committed prior to the logical change number.

3. The computer-readable storage medium of claim 1 further comprising executable instructions to:
   determine that the clone of the source database is utilized across a heterogeneous system;
   generate a cross-clone database; and
   transfer the data from the clone of the source database to the cross-clone database, wherein the cross-clone database contains all of the transactions that are present in the clone of the source database.

4. The computer-readable storage medium of claim 3 further comprising executable instructions to transfer the cross-clone database to the replica database.

5. The computer-readable storage medium of claim 1, wherein the executable instructions to form the clone of the source database include executable instructions to use load and unload utilities.

6. The computer-readable storage medium of claim 1, wherein the executable instructions to form the clone of the source database include executable instructions to make a split mirror backup.

7. A method of creating a replica of a source database, the method comprising:
   receiving a hot backup logical change number for the source database indicating initiation of hot backup replication of the source database;
   in response to receiving the hot backup logical change number, initiating hot back-up of the source database, wherein the initiating of the hot backup of the source database includes:
      forming a clone of the source database up to the hot backup logical change number while the source database operates with full data availability, wherein the clone of the source database is a copy of the source database as of the hot backup logical change number, and wherein the source database operating with full data availability comprises actively accepting read and write operations on data within files being backed up during replication of the source database;
      transferring the clone of the source database to a replica database while the source database continues to operate with full data availability, wherein the clone of the source database includes transactions committed before the hot backup logical change number; and
      utilizing a log based extraction apply process starting at the hot backup logical change number to update the replica database with transactions committed after the hot backup logical change number by generating a transaction log which includes transactions committed after the hot backup logical change number and before a commit logical change number, wherein the commit logical change number indicates read and write commands which were issued and not committed after the hot backup logical change number but before the commit logical change number.

8. A system for creating a replica of a source database, the method comprising:
   a storage memory; and
   a processor coupled to the storage memory, wherein the processor is configured to execute sets of instructions stored on the storage memory which cause the processor to implement the method comprising:
      receiving a hot backup logical change number for the source database indicating initiation of hot backup replication of the source database;

in response to receiving the hot backup logical change number, initiating hot back-up of the source database, wherein the initiating of the hot backup of the source database includes:

forming a clone of the source database up to the hot backup logical change number while the source database operates with full data availability, wherein the clone of the source database is a copy of the source database as of the hot backup logical change number, and wherein the source database operating with full data availability comprises actively accepting read and write operations on data within files being backed up during replication of the source database;

transferring the clone of the source database to a replica database while the source database continues to operate with full data availability, wherein the clone of the source database includes transactions committed before the hot backup logical change number; and utilizing a log based extraction apply process starting at the hot backup logical change number to update the replica database with transactions committed after the hot backup logical change number by generating a transaction log which includes transactions committed after the hot backup logical change number and before a commit logical change number, wherein the commit logical change number indicates read and write commands which were issued and not committed after the hot backup logical change number but before the commit logical change number.

* * * * *

UNITED STATES PATENT AND TRADEMARK OFFICE
CERTIFICATE OF CORRECTION

| | |
|---|---|
| PATENT NO. | : 7,885,922 B2 |
| APPLICATION NO. | : 11/551678 |
| DATED | : February 8, 2011 |
| INVENTOR(S) | : Pareek et al. |

It is certified that error appears in the above-identified patent and that said Letters Patent is hereby corrected as shown below:

In column 1, line 43, delete "data an" and insert -- data, an --, therefor.

In column 4, line 25, delete "instantiation" and insert -- instantiation, --, therefor.

In column 4, line 35, delete "vet" and insert -- yet --, therefor.

In column 5, line 14, delete "the database" and insert -- the database, --, therefor.

In column 7, line 24, delete "In particular" and insert -- In particular, --, therefor.

Signed and Sealed this
Twentieth Day of September, 2011

David J. Kappos
*Director of the United States Patent and Trademark Office*